A. S. HUBBARD.
ELECTRICAL SYSTEM OF DISTRIBUTION.
APPLICATION FILED JULY 1, 1911.
1,009,666.
Patented Nov. 21, 1911.
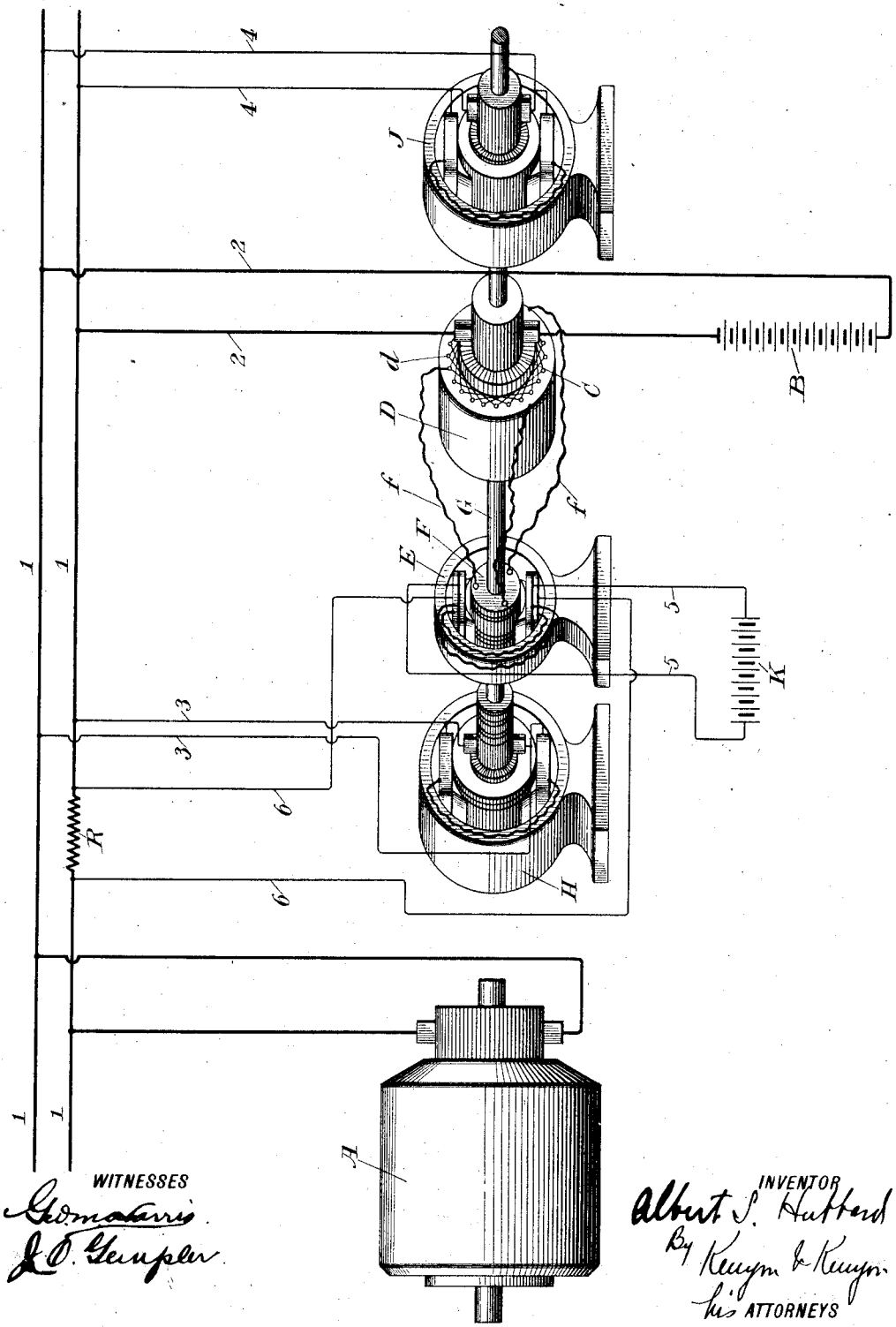

UNITED STATES PATENT OFFICE.

ALBERT S. HUBBARD, OF GREENWICH, CONNECTICUT, ASSIGNOR TO GOULD STORAGE BATTERY COMPANY, A CORPORATION OF NEW YORK.

ELECTRICAL SYSTEM OF DISTRIBUTION.

1,009,666.   Specification of Letters Patent.   Patented Nov. 21, 1911.

Original application filed February 25, 1908, Serial No. 417,758. Divided and this application filed July 1, 1911. Serial No. 636,366.

*To all whom it may concern:*

Be it known that I, ALBERT S. HUBBARD, a citizen of the United States, and a resident of Greenwich, Fairfield county, State of Connecticut, have invented certain new and useful Improvements in Electrical Systems of Distribution, of which the following is a specification.

My invention relates to electrical systems of distribution employing storage apparatus such as the well known storage battery acting to steady the load on a generating station or sub-station and positively regulated to perform such service accurately and efficiently. This application is a division of my application Serial Number 417,758, filed February 25th 1908. In employing such storage apparatus with direct current circuits it has been usual to provide a dynamo in series with the battery and regulated responsively to fluctuations in some part of the system. This dynamo is known as a booster. Ordinarily intermediate apparatus has been employed to regulate the field strength of this booster in order to produce the desired results. In such systems the automatic regulation has been often interfered with seriously because of the lag in the regulating apparatus by reason of which the battery will not respond with sufficient rapidity to fluctuations of load in the system. As these fluctuations are often extremely rapid and it is one of the important purposes of the battery that it should relieve the generating apparatus from very rapid fluctuations, this evil is a serious one. The principal lag is in the booster itself. By my present invention I eliminate this lag.

My invention consists in the peculiar construction, excitation and regulation of the booster in such systems, whereby I am enabled to produce an instantaneous response in the booster to the variations in the intensity of the exciting current applied to its field.

My invention will be more fully understood from the description which follows of one embodiment of my invention which is shown diagrammatically in the drawing.

Referring to the drawing A represents the armature of a main generator supplying the main distribution circuit, 1, 1. Connected in the circuit 2, 2, across the circuit 1, 1, is a storage battery B, and in series therewith the armature, C, of a booster. The booster is provided with a rotatable field structure, D, provided with distributed windings $d$. Mechanically connected to this field structure, D, and therefore rotating at the same speed therewith is the armature F of an exciting dynamo E. In the armature F there are generated polyphase alternating currents which are delivered to the field windings, $d$, without commutation by means of the conductors, $f$. If these alternating currents were delivered to the windings $d$ while the field structure D was stationary, a rotating field would be set up in said field structure. Therefore the field structure is rotated so that the field flux will always maintain practically the same position. This is accomplished by the mechanical connection, G, between the field structure D and the exciter armature, F, the connections, $f$, being so arranged that the mechanical rotation of the field structure D is opposite to that of the electrical rotation of the field flux therein, whereby the field flux is maintained in a practically fixed position. The exciter armature F is driven at a practically constant speed by the shunt motor H connected to the main circuit, 1, 1, by the leads 3, 3. The booster armature is independently driven at any desired practically constant speed in any well known manner, as by a shunt motor, J, connected to the main circuit, 1, 1, by the leads, 4, 4.

The exciter E is provided with two field windings, one of which is connected to a battery K, by leads, 5, 5, and the field strength thereof is therefore maintained at a practically constant value. The other field windings carries regulating or varying current and is connected by the leads, 6, 6, across the shunt R in the circuit of the main generator, so that the current in this field varies with that of the generator.

The two field coils of the exciter E operate in opposition to each other and when the current output of the source A is at a given predetermined value the field strength produced by one coil is equal to that of the other and hence the resulting field strength of the exciter, E, is *nil*. If the load on the main generator A increases beyond this value because of increase of the current in the main circuit or for any other reason, the current passing through the leads 6, 6, will increase in value, which will increase the field strength of the coil connected thereto. A resultant field is therefore set up in the exciter E, and, its armature, F, furnishes an alternating current to the field structure D, in such a direction that an electromotive force is set up in the booster armature C. This electromotive force will be the same direction as that of the battery, B, and will cause it to discharge into the main circuit, 1, 1, to take the extra load imposed thereupon. If the current delivered by the main generator, A, falls below the predetermined value, the reverse operations take place and the electromotive force generated in the booster armature causes the battery to be charged from the main circuit, 1, 1.

No claims are made herein to the dynamo apparatus independently of the system as a whole as that forms the subject matter of my original application above named.

I desire it to be understood that while I have described in detail one specific embodiment of my invention, yet that I do not desire to be limited to the exact details which I have shown and described since departures may be made therein without departing from the principle constituting my invention as set out in the following claims.

1. In an electrical system of distribution, the combination of a main distributing circuit, a battery and booster armature in operative relation thereto, and a field structure for said armature which is energized by alternating currents.

2. In an electrical system of distribution, the combination of a main distributing circuit, a battery and bolster armature in operative relation thereto, and a field structure for said armature which is energized by alternating currents therein responsive to changes in the electrical condition of the system.

3. In an electrical system of distribution, the combination of a main distributing circuit, a battery and booster armature in operative relation thereto, and a rotatable field structure for said armature which is energized by alternating currents therein responsive to changes in the electrical condition of the system.

4. In an electrical system of distribution, the combination of a main distributing circuit, a battery and booster armature in operative relation thereto, a rotatable field structure for said armature energized by alternating currents and means responsive to variations in the electrical condition of the system for providing said energizing alternating current.

5. In an electrical system of distribution, the combination of a main distributing circuit, a storage apparatus, a regulating dynamo therefor having a rotatable field structure energized by alternating currents, and an exciter responsive to variations in the electrical condition of the system producing said alternating current.

6. In an electrical system of distribution, the combination of a main distributing circuit, a storage apparatus, a regulating dynamo therefor having a rotatable field structure energized by alternating currents, and an exciter for producing said alternating current, said exciter being provided with a field winding, the strength of the current in which is responsive to changes in the electrical condition of the system.

7. In an electrical system of distribution, the combination of a main distributing circuit, a storage apparatus, a regulating dynamo therefor having a rotatable field structure energized by alternating currents, and an exciter for producing said alternating current, said exciter being provided with two field windings one of which carries a practically constant current and the other of which carries a current responsive to changes in the electrical condition of the system.

8. In an electrical system of distribution, the combination of a main distributing circuit, a battery and booster armature in operative relation thereto, a field structure for said armature energized by alternating current therein, and an exciter for furnishing said alternating current and provided with a field winding, the current in which is responsive to variations in the electrical condition of the system.

9. In an electrical system of distribution, the combination of a main distributing circuit, a battery and booster armature in operative relation thereto, a field structure for said armature energized by polyphase currents and means for producing said currents responsive to changes in the electrical condition of the system.

10. In an electrical system of distribution, the combination of a main distributing circuit, a battery and a booster armature in operative relation thereto, a rotatable field structure for said armature energized by alternating current and an exciter the armature of which is connected to rotate at synchronous speed with said field structure and furnishes the alternating exciting current therefor.

11. In an electrical system of distribution, the combination of a main direct current circuit, storage apparatus in operative relation thereto, a regulating dynamo therefor having a rotatable armature provided with a commutator and brushes, an alternating current exciter supplying the exciting current to the field structure of said regulating dynamo, and means for producing a relative rotation between said field structure and the brushes bearing on the commutator of the regulating dynamo, which relative rotation shall be at synchronous speed with the speed of the exciter armature.

12. In an electrical system of distribution, the combination of a main distribution circuit, a battery and a booster armature in operative relation thereto, a rotatable field structure for said armature and an exciter the armature of which is connected to rotate at synchronous speed with said field structure and furnishes an alternating exciting current to said field structure responsive to variations in the electrical condition of the system.

13. In an electrical system of distribution, the combination of a main distribution circuit, a battery and a booster armature in operative relation thereto, a field structure for said armature and an exciter the armature of which is connected to rotate at synchronous speed with said field structure and furnishes a polyphase exciting current to said field structure responsive to variations in the electrical condition of the system.

14. In an electrical system of distribution, the combination of a main distribution circuit, a battery and a booster armature in operative relation thereto, a rotatable field structure for said armature, an exciting dynamo for said field structure, means for rotating said dynamo and field structure at synchronous speed and independent means for rotating said booster armature.

15. In an electrical system of distribution, the combination of a main distribution circuit, a battery and a booster armature in operative relation thereto, a rotatable field structure for said armature, an exciting dynamo for said field structure responsive to variations in the electrical condition of the system, means for rotating said dynamo and field structure at approximately the same speed and independent means for rotating said booster armature.

16. In an electrical system of distribution, the combination of a main distribution circuit, a battery and a booster armature in operative relation thereto, a rotatable field structure for said armature, an exciting dynamo for said field structure for furnishing alternating current thereto, means for rotating said dynamo and field structure at the same speed and independent means for rotating said booster armature.

17. In an electrical system of distribution, the combination of a main distribution circuit, a battery and booster armature in operative relation thereto, a rotatable field structure for said armature energized by alternating current and means for rotating the field structure to always maintain the field flux thereof practically stationary.

18. In an electrical system of distribution, the combination of a main distribution circuit, a battery and booster armature in operative relation thereto, a rotatable field structure for said armature energized by alternating currents, means responsive to variations in the electrical condition of the system for supplying said alternating currents and means for rotating the field structure to always maintain the field flux thereof in practically the same position.

19. In an electrical system of distribution, the combinaion of a direct current generator, a battery in operative relation thereto, a dynamo for regulating the action of the battery responsive to changes in the electrical condition of the system, said dynamo being provided with a rotatable alternating current field structure and an independently rotatable armature.

20. In an electrical system of distribution, the combination of a direct current generator, a battery in operative relation thereto, a dynamo for regulating the action of the battery responsive to variations in the electrical condition of the system, means for producing polyphase currents varying with changes of electrical condition of the system, said dynamo being provided with a rotatable field structure energized by said polyphase currents and means for rotating said field structure in synchronism with said currents.

21. The combination of a direct current generator, a battery in operative relation thereto, a dynamo and means for regulating the battery action responsive to changes of electromotive force generated by said dynamo, means for producing an alternating current varying with changes of electrical condition of the system, said dynamo being provided with a rotatable field structure energized by a polyphase current producing a rotating field therein.

22. The combination of a main generator, a battery in operative relation thereto, a dynamo, means for regulating the battery action responsive to changes of electromotive force generated by said dynamo, said dynamo being provided with a rotatable field structure energized by alternating currents producing a rotating field therein and means for rotating said field structure in synchronism with said alternating currents.

23. The combination of a main generator, a battery in operative relation thereto, a dynamo, and means for regulating the action of the battery responsive to changes of electromotive force generated by said dynamo, said dynamo being provided with a rotatable field structure energized by alternating currents therein and a rotatable armature.

24. The combination in a direct current system of distribution, of a storage apparatus, an alternating current dynamo excited responsively to variations of electrical condition of the system, a second dynamo having a field structure supplied by the said alternating current dynamo and an armature with commutator and brushes, means for rotating said last named armature, independent means for producing a relative rotation at a speed synchronous with that of the alternating current dynamo between the field structure and the commutator brushes of said second dynamo, and means for regulating the action of the storage apparatus responsively to the armature output of said second dynamo.

25. The combination in a direct current system of distribution of a storage apparatus, a dynamo acting to regulate the action of the same and provided with a field structure, armature, commutator and brushes, means for rotating said armature and independently rotating said field with reference to said brushes, and an alternating current dynamo supplying current to said field structure thereof and rotated synchronously with said field structure.

26. The combination in a direct current system of distribution of a storage apparatus, a dynamo acting to regulate the action of the same and provided with a field structure, armature, commutator and brushes, means for rotating said armature and independently rotating said field with reference to said brushes, and an alternating current dynamo supplying current to said field structure thereof and rotated synchronously with said field structure, said alternating current dynamo being itself excited responsively to changes in the system of distribution.

In testimony whereof, I have signed my name to this specification, in the presence of two subscribing witnesses.

ALBERT S. HUBBARD.

Witnesses:
RICHARD EYRE,
EDWIN SEGER.

---

Copies of this patent may be obtained for five cents each, by addressing the "Commissioner of Patents, Washington, D. C."